(12) United States Patent
Huang et al.

(10) Patent No.: US 11,456,811 B2
(45) Date of Patent: Sep. 27, 2022

(54) WIRELESS COMMUNICATION METHOD AND ASSOCIATED WIRELESS COMMUNICATION DEVICE

(71) Applicant: MEDIATEK INC., Hsin-Chu (TW)

(72) Inventors: Po-Hsun Huang, Hsinchu (TW); Juei-Ting Sun, Hsinchu (TW); Yu-Ming Wen, Hsinchu (TW); Chang-Yi Hsu, Hsinchu (TW); Kuan-Hua Chao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 281 days.

(21) Appl. No.: 16/404,748

(22) Filed: May 7, 2019

(65) Prior Publication Data
US 2020/0358544 A1 Nov. 12, 2020

(51) Int. Cl.
*H04J 4/00* (2006.01)
*H04W 72/04* (2009.01)
*H04W 88/10* (2009.01)
*H04W 84/12* (2009.01)

(52) U.S. Cl.
CPC ............. *H04J 4/00* (2013.01); *H04W 72/044* (2013.01); *H04W 84/12* (2013.01); *H04W 88/10* (2013.01)

(58) Field of Classification Search
CPC ....... H04J 4/00; H04W 72/044; H04W 72/02; H04W 84/12; H04W 88/10; H04W 72/12; H04W 72/1215; H04W 88/06; H04W 8/005; H04W 76/20; H04M 1/72412; H04B 1/00; H04B 1/126; Y02D 30/70
See application file for complete search history.

(56) References Cited

U.S. PATENT DOCUMENTS

| | | | |
|---|---|---|---|
| 8,442,016 B1 * | 5/2013 | Lee | H04W 16/14 370/338 |
| 8,606,182 B2 | 12/2013 | Wyper | |
| 2008/0279138 A1 * | 11/2008 | Gonikberg | H04W 88/06 370/328 |
| 2010/0303183 A1 * | 12/2010 | Desai | H04B 1/1027 375/350 |
| 2013/0155931 A1 * | 6/2013 | Prajapati | H04W 52/0209 370/311 |
| 2014/0194155 A1 * | 7/2014 | Ko | H04B 1/406 455/552.1 |
| 2015/0350815 A1 * | 12/2015 | Lee | H04W 4/80 455/41.2 |
| 2015/0373769 A1 * | 12/2015 | Wang | H04W 76/20 455/419 |
| 2017/0086097 A1 * | 3/2017 | Wasily | H04W 88/06 |
| 2019/0123867 A1 | 4/2019 | Sun | |
| 2019/0222245 A1 * | 7/2019 | Lim | H04W 72/12 |
| 2022/0151023 A1 * | 5/2022 | Damnjanovic | H04B 7/026 |

FOREIGN PATENT DOCUMENTS

| | | |
|---|---|---|
| TW | I551160 B | 9/2016 |
| TW | I601436 B | 10/2017 |

\* cited by examiner

*Primary Examiner* — Oussama Roudani
(74) *Attorney, Agent, or Firm* — Winston Hsu

(57) ABSTRACT

A wireless communication method of a wireless device is provided, wherein the wireless communication method comprises the steps of: building links with a plurality of electronic devices, respectively; and simultaneously using a time division multiplex mode and a frequency division multiplex mode to communicate with the plurality of electronic devices.

18 Claims, 4 Drawing Sheets

WIRELESS COMMUNICATION METHOD AND ASSOCIATED WIRELESS COMMUNICATION DEVICE

BACKGROUND

When a Wi-Fi multi-channel concurrency (MCC) mode and a Bluetooth are used to communicate with a plurality of electronic devices, a time division multiplex (TDD) mode or a frequency division multiplex (FDD) mode may be adopted for the communications. However, if the FDD mode is used, the Bluetooth may not have enough adaptive frequency hopping (AFH) channels due to two 2.4 GHz Wi-Fi channels in the Wi-Fi MCC mode, causing performance degradation of the Bluetooth communications. If the TDD mode is used, air-time will be separated into three parts (two for Wi-Fi channels and one for Bluetooth), and the performance may be worsened.

SUMMARY

It is therefore an objective of the present invention to provide a wireless device, which uses a hybrid mode for the MCC and Bluetooth communications, to solve the above-mentioned problems.

According to one embodiment of the present invention, a wireless communication method of a wireless device is provided, wherein the wireless communication method comprises the steps of: building links with a plurality of electronic devices, respectively; and simultaneously using a time division multiplex mode and a frequency division multiplex mode to communicate with the plurality of electronic devices.

According to another embodiment of the present invention, a wireless device comprises a circuitry configured to: building links with a plurality of electronic devices, respectively; and simultaneously using a time division multiplex mode and a frequency division multiplex mode to communicate with the plurality of electronic devices.

According to another embodiment of the present invention, a wireless device comprises a circuitry configured to: using a Bluetooth to communicate with a first electronic device; using a first Wi-Fi channel to communicate with a second electronic device, wherein the Bluetooth and the first Wi-Fi channel are used under a time division multiplex mode; using a second Wi-Fi channel to communicate with a third electronic device, wherein the Bluetooth and the second Wi-Fi channel are used under a frequency division multiplex mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
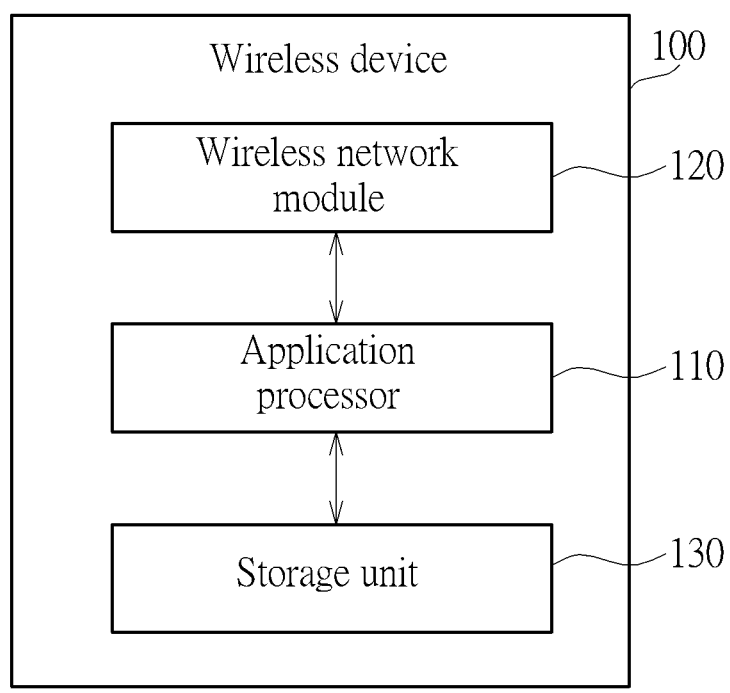
FIG. 1 is a diagram illustrating a wireless device according to one embodiment of the present invention.

FIG. 1 is a diagram illustrating a wireless device 100 according to one embodiment of the present invention. In this embodiment, the wireless device 100 may be an electronic device such as a smartphone, a tablet, a notebook or any other portable device, and the wireless device 100 comprises an application processor 110, a wireless network module 120 and a storage unit. The application processor 110 is arranged to execute applications running on a system of the wireless device 100. The wireless network module 120 may comprise a Wi-Fi module, a Bluetooth module and/or any other suitable network circuit capable of connecting to Internet or other electronic devices. In this embodiment, the wireless network module 120 support at least Wi-Fi MCC mode and a Bluetooth advanced audio distribution profile (A2DP). The storage unit 130 may comprise a plurality of different storage devices, and stores data related to the application processor 110 and the wireless network module 120.

Figure 2:
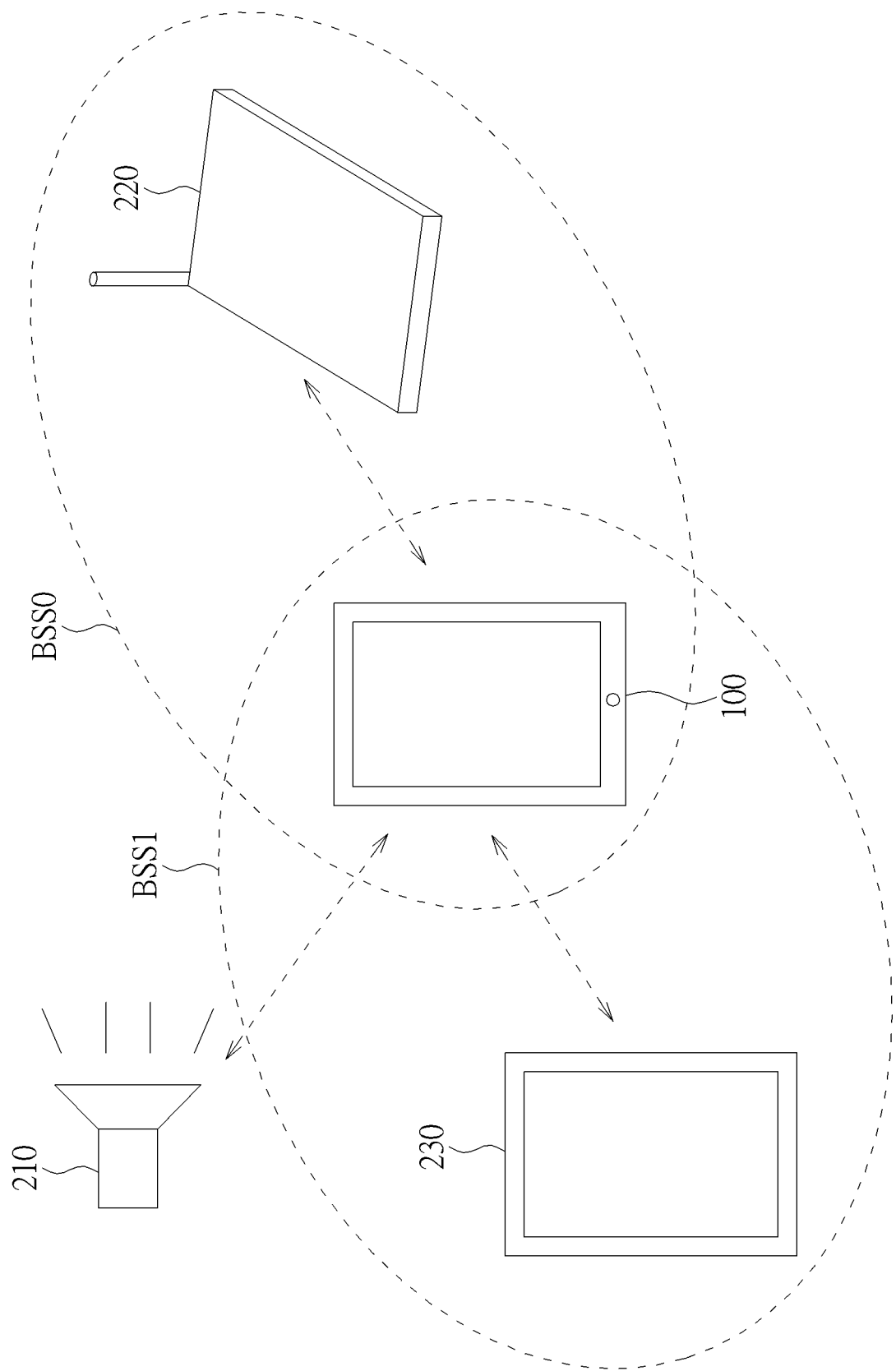
FIG. 2 is a diagram illustrating a communication system according to one embodiment of the present invention.

FIG. 2 is a diagram illustrating a communication system according to one embodiment of the present invention. As shown in FIG. 2, the wireless device 100 builds links with a plurality of electronic devices 210, 220 and 230. In this embodiment, the wireless device 100 communicates with the electronic device 210 by using the Bluetooth A2DP; the wireless device 100 communicates with the electronic device 220 by using a first Wi-Fi channel, and the wireless device 100 and the electronic device 220 belong to a basic service set BSS0; and the wireless device 100 communicates with the electronic device 230 by using a second Wi-Fi channel, and the wireless device 100 and the electronic device 230 another basic service set BSS1. In this embodiment, because the Bluetooth and the Wi-Fi channels use 2.4 GHz industrial scientific medical (ISM) band, the wireless device 100 uses a hybrid mode of TDD and FDD to efficiently communicate with the electronic devices 210, 220 and 230 while maintaining the performance.

Figure 3:
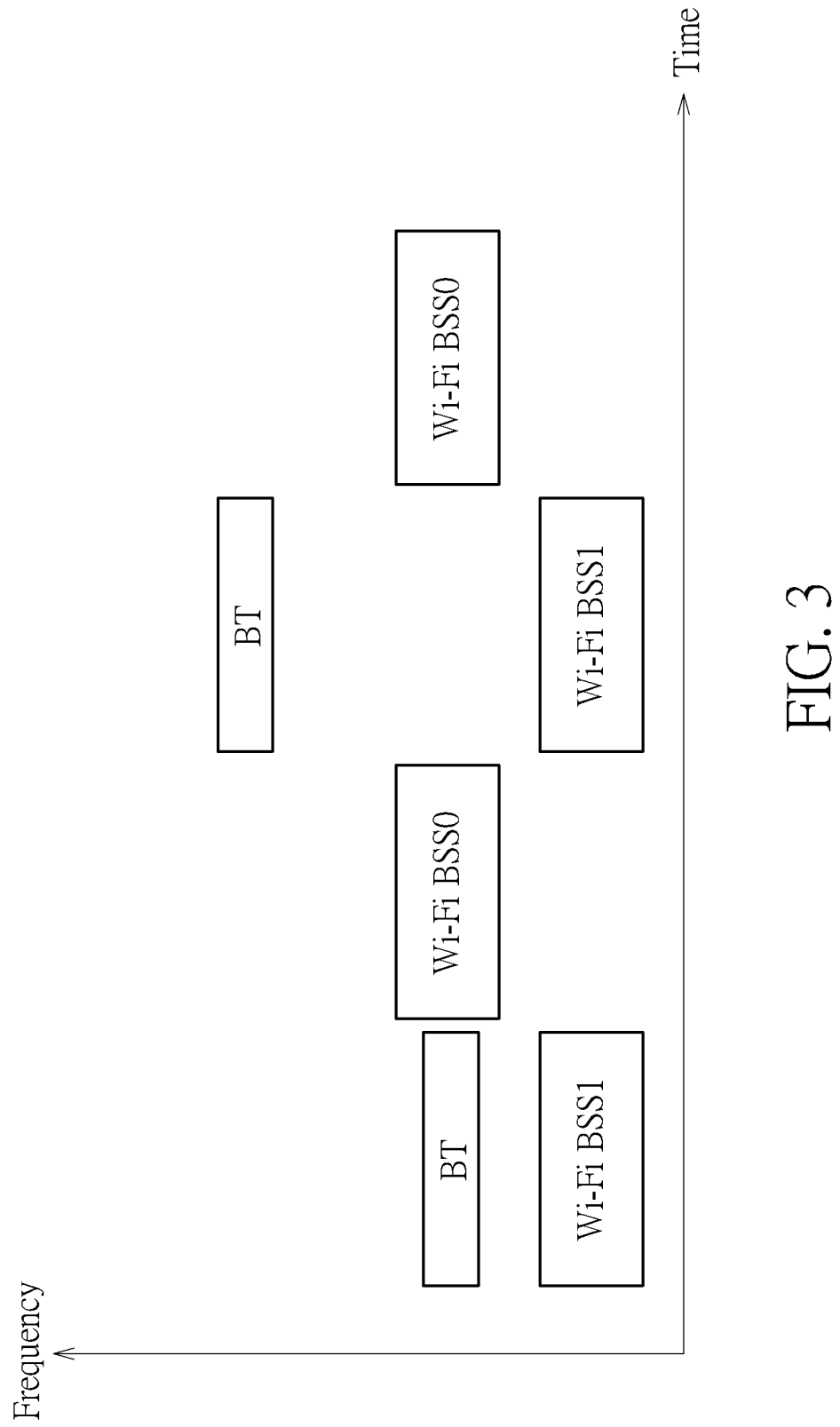
FIG. 3 shows the TDD mode and FDD mode used in the communication system according to one embodiment of the present invention.

FIG. 3 shows the TDD mode and FDD mode used in the communication system according to one embodiment of the present invention. In FIG. 3, the Bluetooth between the wireless device 100 and the electronic device 210 and the first Wi-Fi channel between the wireless device 100 and the electronic device 220 (BSS0) are used under the TDD mode, and the Bluetooth between the wireless device 100 and the electronic device 210 and the second Wi-Fi channel between the wireless device 100 and the electronic device 230 (BSS1) are used under the FDD mode. In detail, during a first period shown in FIG. 3, the wireless device 100 uses the Bluetooth to communicate with the electronic device 210, and uses the second Wi-Fi channel to communicate with the electronic device 230 (BSS1), where the selected Bluetooth channel and the second Wi-Fi channel have different frequencies. During a second period following the first period, the wireless device 100 uses the first Wi-Fi channel to communicate with the electronic device 220 (BSS0), and at this time the wireless device 100 does not communicate with the electronic devices 210 and 230. During a third period following the second period, the wireless device 100 uses the Bluetooth to communicate with the electronic device 210, and uses the second Wi-Fi channel to communicate with the electronic device 230 (BSS1), where the selected Bluetooth channel may have different frequency with the first period. Then, during a fourth period following the third period, the wireless device 100 uses the first Wi-Fi channel to communicate with the electronic device 220 (BSS0) . . . and so on.

In the embodiment shown in FIG. 3, in order to have the better performance, on the average, a frequency difference between the Bluetooth and the first Wi-Fi channel is less than a frequency difference between the Bluetooth and the second Wi-Fi channel. For example, the first Wi-Fi channel may be channel 1 (2437 MHz), the second Wi-Fi channel may be channel 6 (2412 MHz), and the Bluetooth channel may be 2437 MHz-2480 MHz (hopping frequency).

In the above-mentioned embodiment, because the only one Wi-Fi channel is used with the Bluetooth at the same time, the Bluetooth will have enough channels for the AFH to improve the performance of the Bluetooth communications. In addition, because the air-time only needs to be separated to two parts even if one Bluetooth and two Wi-Fi channels are used, the communication efficiency will not be worsened.

In addition, the Bluetooth and Wi-Fi mentioned above are for illustrative purposes only. In other embodiments of the present invention, other types of wireless network technologies may be used in the hybrid mode of the wireless device 100. This alternative design shall fall within the scope of the present invention.

Figure 4:
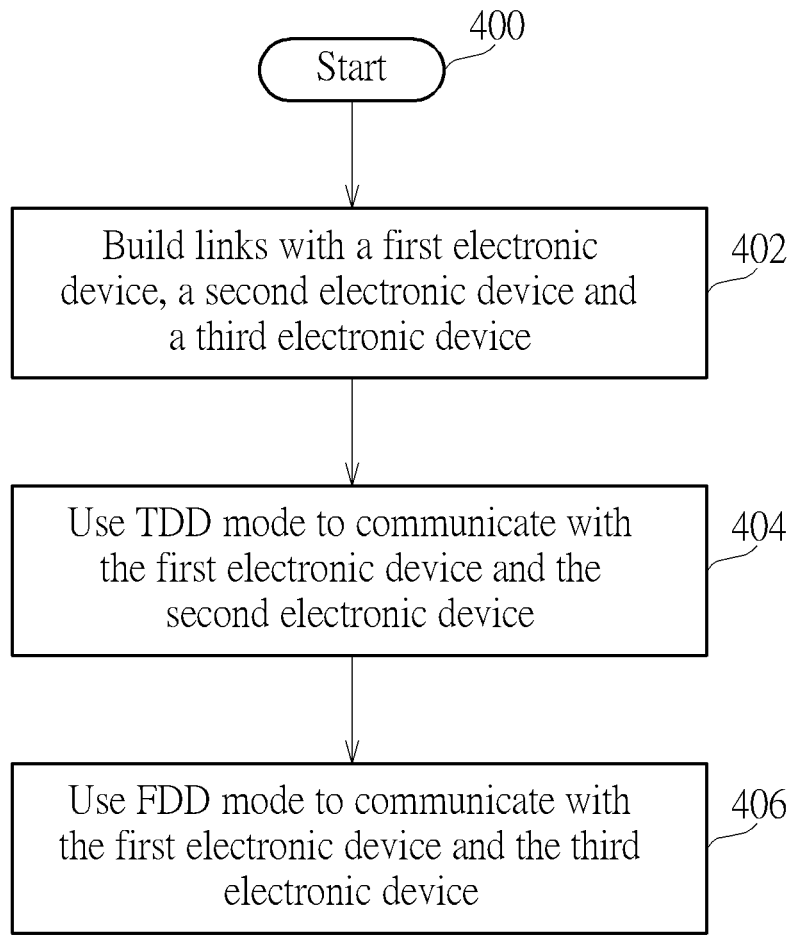
FIG. 4 is a flowchart of a wireless communication method of the wireless device according to one embodiment of the present invention.

FIG. 4 is a flowchart of a wireless communication method of the wireless device 100 according to one embodiment of the present invention. Referring to FIG. 4 and the embodiments shown in FIGS. 1-3, the flowchart is described as follows.

Step 400: start.

Step 402: build links with a first electronic device, a second electronic device and a third electronic device.

Step 404: use TDD mode to communicate with the first electronic device and the second electronic device.

Step 406: use FDD mode to communicate with the first electronic device and the third electronic device.

Briefly summarized, in the wireless communication method and associated wireless device, the TDD mode and the FDD mode are simultaneously used to communicate with a plurality of electronic devices. By using the hybrid mode of the present invention, the Bluetooth may have enough channels for the AFH to improve the performance of the Bluetooth communications, and the air-time for the TDD mode only needs to be separated to two parts even if one Bluetooth and two Wi-Fi channels are used. Hence, the wireless communication method of the present invention can improve the efficiency and performance while the Wi-Fi MCC and Bluetooth are used.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of a wireless device, comprising:
building links with a plurality of electronic devices, respectively; and
simultaneously using a time division multiplex (TDD) mode and a frequency division multiplex (FDD) mode to communicate with the plurality of electronic devices;
wherein the plurality of electronic devices comprise a first electronic device, a second electronic device and a third electronic device, and the step of simultaneously using the TDD mode and the FDD mode to communicate with the plurality of electronic devices comprises:
using a Bluetooth to communicate with the first electronic device;
using a first Wi-Fi channel to communicate with the second electronic device; and
using a second Wi-Fi channel to communicate with the third electronic device;
wherein the Bluetooth and the first Wi-Fi channel are used under the TDD mode, and
the Bluetooth and the second Wi-Fi channel are used under the FDD mode;
wherein during a first period, the wireless device uses the second Wi-Fi channel to communicate with the third electronic device while using the Bluetooth to communicate with the first electronic device, and the wireless device does not communicate with the second electronic device; and
during a second period following the first period, the wireless device uses the first Wi-Fi channel to communicate with the second electronic device, and the wireless device does not communicate with the first electronic device and the third electronic device.

2. The wireless communication method of claim 1, wherein the second electronic device and the third electronic device belong to different basic service set (BSS).

3. The wireless communication method of claim 1, wherein a frequency difference between the Bluetooth and the first Wi-Fi channel is less than a frequency difference between the Bluetooth and the second Wi-Fi channel.

4. The wireless communication method of claim 1, wherein the wireless device communicates with the plurality of electronic devices by using a same band.

5. The wireless communication method of claim 4, wherein the wireless device communicates with the plurality of electronic devices by using a 2.4 GHz industrial scientific medical (ISM) band.

6. The wireless communication method of claim 4, wherein the wireless device communicates with the plurality of electronic devices by using a Bluetooth and two different Wi-Fi channels.

7. A wireless device, comprising:
a circuitry configured to:
building links with a plurality of electronic devices, respectively; and
simultaneously using a time division multiplex (TDD) mode and a frequency division multiplex (FDD) mode to communicate with the plurality of electronic devices;
wherein the plurality of electronic devices comprise a first electronic device, a second electronic device and a third electronic device; and the circuitry uses a Bluetooth to communicate with the first electronic device, uses a first Wi-Fi channel to communicate with the second electronic device, and uses a second Wi-Fi channel to communicate with the third electronic device, wherein the Bluetooth and the first Wi-Fi channel are used under the TDD mode, and the Bluetooth and the second Wi-Fi channel are used under the FDD mode;

wherein during a first period, the wireless device uses the second Wi-Fi channel to communicate with the third electronic device while using the Bluetooth to communicate with the first electronic device, and the wireless device does not communicate with the second electronic device; and during a second period following the first period, the wireless device uses the first Wi-Fi channel to communicate with the second electronic device, and the wireless device does not communicate with the first electronic device and the third electronic device.

8. The wireless device of claim 7, wherein the second electronic device and the third electronic device belong to different basic service set (BSS).

9. The wireless device of claim 7, wherein a frequency difference between the Bluetooth and the first Wi-Fi channel is less than a frequency difference between the Bluetooth and the second Wi-Fi channel.

10. The wireless device of claim 7, wherein the circuitry communicates with the plurality of electronic devices by using a same band.

11. The wireless device of claim 10, wherein the circuitry communicates with the plurality of electronic devices by using a 2.4 GHz industrial scientific medical (ISM) band.

12. The wireless device of claim 10, wherein the circuitry communicates with the plurality of electronic devices by using a Bluetooth and two different Wi-Fi channels.

13. A wireless device, comprising:
a circuitry configured to:
using a Bluetooth to communicate with a first electronic device;
using a first Wi-Fi channel to communicate with a second electronic device,
wherein the Bluetooth and the first Wi-Fi channel are used under a time division multiplex (TDD) mode;
using a second Wi-Fi channel to communicate with a third electronic device, wherein the Bluetooth and the second Wi-Fi channel are used under a frequency division multiplex (FDD);
wherein during a first period, the wireless device uses the second Wi-Fi channel to communicate with the third electronic device while using the Bluetooth to communicate with the first electronic device, and the wireless device does not communicate with the second electronic device; and during a second period following the first period, the wireless device uses the first Wi-Fi channel to communicate with the second electronic device, and the wireless device does not communicate with the first electronic device and the third electronic device.

14. The wireless device of claim 13, wherein the second electronic device and the third electronic device belong to different basic service set (BSS).

15. The wireless device of claim 13, wherein a frequency difference between the Bluetooth and the first Wi-Fi channel is less than a frequency difference between the Bluetooth and the second Wi-Fi channel.

16. The wireless communication method of claim 1, wherein during a third period following the second period, the wireless device uses the second Wi-Fi channel to communicate with the third electronic device while using the Bluetooth to communicate with the first electronic device, and the wireless device does not communicate with the second electronic device; and during a fourth period following the third period, the wireless device uses the first Wi-Fi channel to communicate with the second electronic device, and the wireless device does not communicate with the first electronic device and the third electronic device.

17. The wireless device of claim 7, wherein during a third period following the second period, the wireless device uses the second Wi-Fi channel to communicate with the third electronic device while using the Bluetooth to communicate with the first electronic device, and the wireless device does not communicate with the second electronic device; and during a fourth period following the third period, the wireless device uses the first Wi-Fi channel to communicate with the second electronic device, and the wireless device does not communicate with the first electronic device and the third electronic device.

18. The wireless device of claim 13, wherein during a third period following the second period, the wireless device uses the second Wi-Fi channel to communicate with the third electronic device while using the Bluetooth to communicate with the first electronic device, and the wireless device does not communicate with the second electronic device; and during a fourth period following the third period, the wireless device uses the first Wi-Fi channel to communicate with the second electronic device, and the wireless device does not communicate with the first electronic device and the third electronic device.

* * * * *